United States Patent [19]
Goldberg

[11] 3,907,372
[45] Sept. 23, 1975

[54] SPOKED WHEEL

[76] Inventor: Leonard Goldberg, 429 E. Smith St., Kent, Wash. 98031

[22] Filed: Aug. 8, 1974

[21] Appl. No.: 487,519

[52] U.S. Cl. .................... 301/104; 301/60; 301/79; 29/159.02
[51] Int. Cl.² ............................................ B60B 1/00
[58] Field of Search ......... 29/159 R, 159 B, 159.01, 29/159.02; 301/60, 79, 104

[56] References Cited
UNITED STATES PATENTS
2,691,207  10/1954  Fincke .................................. 301/60

Primary Examiner—M. Henson Wood, Jr.
Assistant Examiner—D. W. Keen
Attorney, Agent, or Firm—John W. Kraft; Charles L. Kraft, II

[57] ABSTRACT

The spoked wheel of this invention includes a pattern of pulling and static spokes issuing from the hub to the rim, terminal ends of the spokes being fastened alternately at right and left sides of the hub and equidistantly at or near the interior centerline of the rim. A static spoke as used herein shall mean a spoke that is disposed at an acute angle toward the direction of forward rotation of the wheel. A pulling spoke shall be understood to be a spoke that is disposed at an acute angle opposite the direction of forward rotation of the wheel. It is an essential element of this invention that the number of pulling spokes in the wheel exceeds the number of static spokes.

3 Claims, 5 Drawing Figures

SPOKED WHEEL

FIELD OF INVENTION

The present invention relates to an improved wheel, and more particularly to a spoked wheel.

DESCRIPTION OF THE PRIOR ART

Spoked wheels commonly used and employed have heretofore comprised a hub, an annular rim, and a symmetrical pattern of pulling and static spokes issuing from the hub to the rim. Such a structure is equally strong against loads in both forward and rearward directions. In fact, however, a wheel, which is driven forward by the application of torque on the hub, is subjected to asymmetric loading in the sense that the tension in the pulling spokes far exceeds the tension in the static spokes. Spoking techniques of the prior art have resulted in broken or deformed spokes due to insufficient strength of the pulling spokes. Techniques employed in the prior art in order to strengthen the wheel against the high incidence of spoke breakage are: the use of spokes made of stronger metal, heavier gauge spokes, and by increasing the total number of spokes in the wheel.

It is primary object of this invention to provide an improved spoked wheel which may employ a relatively few number of spokes of ordinary strength to create a high-strength wheel stressed to resist spoke damage due to forward torque.

It is a further object of this invention that the aforesaid wheel be adaptable to variations of the number of total spokes used, and the number of pulling spokes compared to static spokes.

It is another primary object of this invention that spokes employed in the present high-strength wheel employ spokes having spokes fabricated of metals of ordinary strength in production in the art.

These and other objects shall become apparent from the description following, it being understood that modifications may be made without affecting the teachings of the invention here set out.

SUMMARY OF THE INVENTION

The spoked wheel of this invention includes a pattern of pulling and static spokes issuing from the hub to the rim, terminal ends of the spokes being fastened alternately at right and left sides of the hub and equidistantly at or near the interior centerline of the rim. A static spoke as used herein shall mean a spoke that is disposed at an acute angle toward the direction of forward rotation of the wheel. A pulling spoke shall be understood to be a spoke that is disposed at an acute angle opposite the direction of forward rotation of the wheel. It is an essential element of this invention that the number of pulling spokes in the wheel exceeds the number of static spokes.

The present structure may be adapted to various spoking ratios wherein pulling spokes exceed static spokes.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
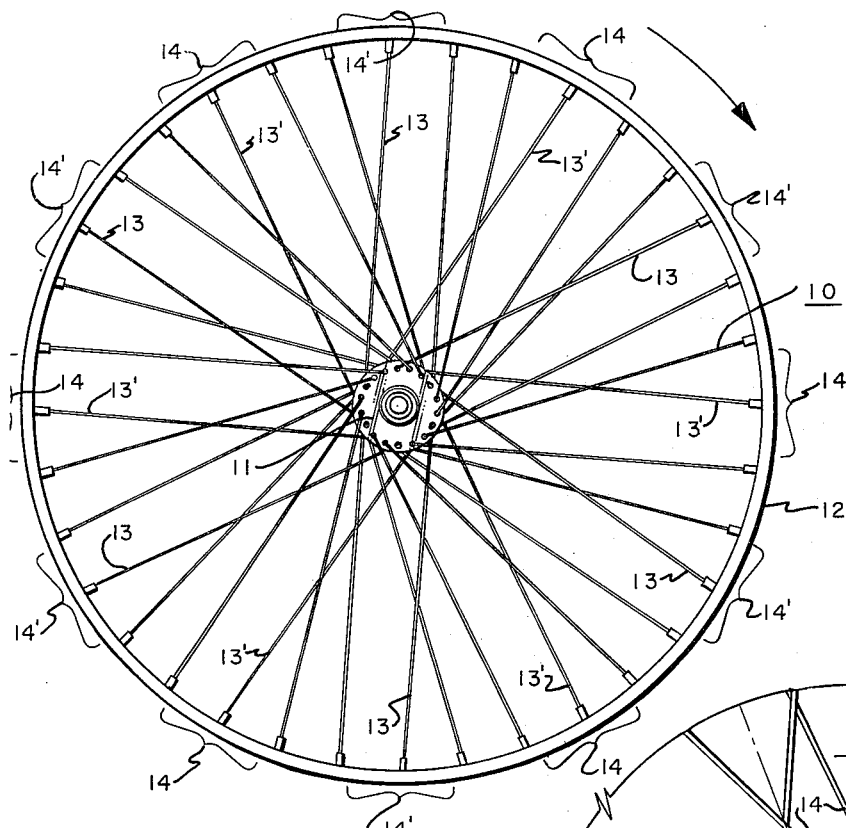
FIG. 1 is a right side elevational view of the spoked wheel of the present invention.

Referring now to the drawings and more particularly to FIG. 1, the spoked wheel of this invention is shown to advantage and generally identified by the numeral 10. The wheel 10 comprises a hub 11, a concentric annular rim 12, a right and a left set of static spokes 13 and 13', respectively, and pulling spokes 14 and 14' mounted from the respective right and left sides (with respect to the usual forward rotation of the wheel 10) from the hub 11 to the interior centerline of the rim 12. It is to be understood that, while only the right side of the wheel 10 is described hereinafter, the left side is symmetrically identical to the right side set forth. It may also be appreciated that the rim 10 may be of the tire-carrying type.

Figure 2:
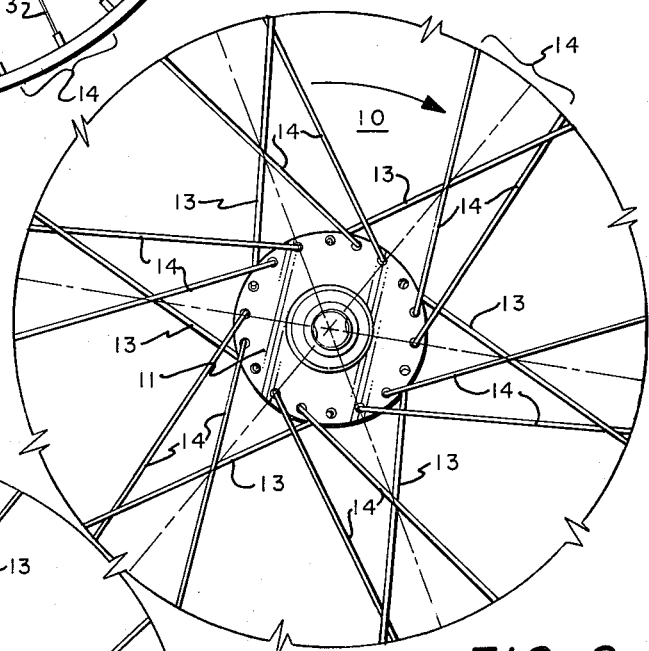
FIG. 2 is a fragmentary right side elevational view of the article of the FIG. 1 drawn substantially to a larger scale, corresponding to the spokes of the right side of the wheel for illustrative purposes.

As shown in the FIGS. 2 and 6, spokes 13 and 14 are mounted between the hub 11 and the rim 12 at an acute angle to geometric radii (shown in broken lines) of the wheel 10, with static spokes 13 lying generally in the direction of forward rotation, and with pulling spokes 14 disposed against forward rotation. Thus, a typical wheel may have a ratio of pulling spokes 14 to static spokes 13 of two to one.

It is to be understood that this structure provides substantially more pulling spokes 14 which may distribute the more usual forces produced by torque applied onto the hub of the wheel 10. This increases the forward torque capacity of the wheel 10 by decreasing load per pulling spoke. This would permit use of spokes of lighter weight or less tensile strength, while providing high load capacity.

Figure 3:
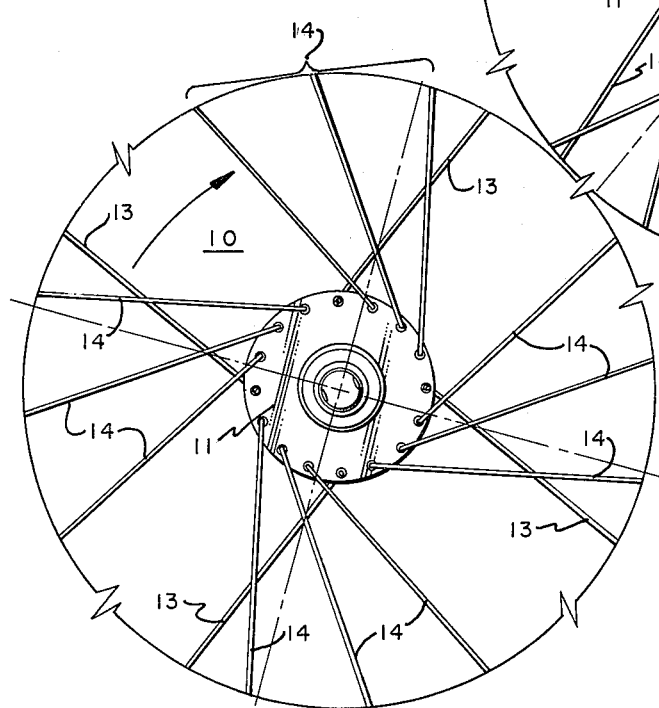
FIG. 3 is a fragmentary right side elevational view of a further embodiment of the present spoked wheel.

Referring now to the FIG. 3, the ratio of pulling spokes 14 to static spokes 13 may be further increased. A ratio of three to one may be accomplished by three pulling spokes 14 crossing each static spoke 13, with spokes 13 and 14 being equidistant at the hub 11 and rim 12.

Figures 4, 5:
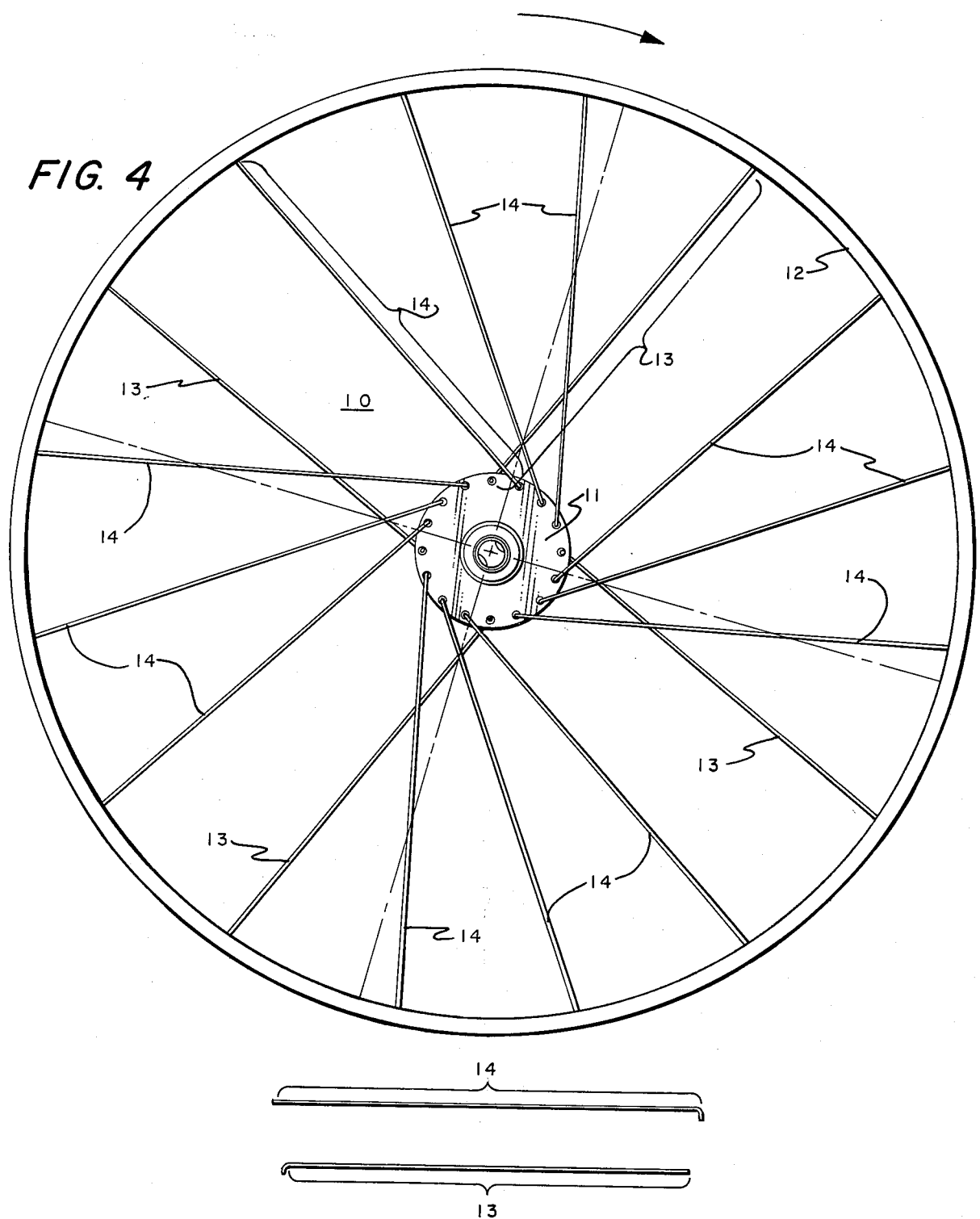
FIG. 4 is a still further embodiment of the apparatus of the spoked wheel.
FIG. 5 is a diagrammatic view of the spokes employed in the embodiment of the FIG. 4.

Both spokes 13 and 14 in the embodiments above may employ spokes of one length. Referring to the FIGS. 4 and 5, a wheel 10 may include static spokes 13 which are shorter than pulling spokes 14. In this embodiment, shorter static spokes 13 are mounted more in alignment with radii of groups defined by spokes 13 (FIGS. 2 and 3). Pulling spokes 14 may be of substantially longer lengths; and, accordingly, are mounted more helically. This structure results in static spokes 13 being disposed toward vector lines of forces of a standing wheel 10, as well as a rearwardly rotating wheel 10. It is to be understood that pulling spokes 14 continue to be directed along vector lines which may distribute loads created by the usual forward rotation of the wheel 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In a spoked wheel having a hub, an annular concentric rim, and static spokes and pulling spokes equidistantly fastened at said hub and said rim, said static spokes lying at an acute angle to radii from said hub in the direction of rotation, and said pulling spokes crossing said static spokes lying at an acute angle to said radii against the direction of rotation, a pattern of said spokes wherein at least a pair of said pulling spokes issue from said hub for each of said static spokes about said wheel.

2. The article of claim 1 wherein three of said pulling spokes issue from said hub for each static spoke.

3. The article of claim 1 wherein a plurality of said pulling spokes issue from said hub for each static spoke, the number of said pulling spokes exceeding the number of said static spokes in said wheel.

* * * * *